United States Patent
Skillman et al.

(10) Patent No.: US 9,104,415 B2
(45) Date of Patent: Aug. 11, 2015

(54) METHOD FOR SELECTING AND LAUNCHING A HYBRID MODE OF OPERATION FOR A PORTABLE DEVICE BASED ON RECEIVED SENSOR INFORMATION AND A CURRENT MODE OF OPERATION

(75) Inventors: Peter Nils Skillman, London (GB); Eric Liu, Santa Clara, CA (US); Karl Townsend, Los Altos, CA (US); Nathaniel Wolf, San Francisco, CA (US); Manjirnath Chatterjee, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/075,161

(22) Filed: Mar. 29, 2011

(65) Prior Publication Data
US 2012/0254631 A1    Oct. 4, 2012

(51) Int. Cl.
*G06F 1/26* (2006.01)
*G06F 1/32* (2006.01)
*G06F 1/16* (2006.01)

(52) U.S. Cl.
CPC ............ *G06F 1/3231* (2013.01); *G06F 1/1694* (2013.01); *G06F 1/3203* (2013.01); *Y02B 60/1289* (2013.01)

(58) Field of Classification Search
CPC ............... G06F 1/1694; G06F 1/3203; G06F 2203/04105
See application file for complete search history.

(56) References Cited

U.S. PATENT DOCUMENTS

| | | | |
|---|---|---|---|
| 7,016,705 B2* | 3/2006 | Bahl et al. | 455/566 |
| 2010/0042827 A1* | 2/2010 | Pratt et al. | 713/100 |
| 2010/0151916 A1 | 6/2010 | Baek et al. | |
| 2010/0207879 A1* | 8/2010 | Fadell et al. | 345/156 |
| 2010/0279751 A1* | 11/2010 | Pourseyed et al. | 455/575.7 |
| 2010/0317332 A1* | 12/2010 | Bathiche et al. | 455/418 |
| 2011/0264928 A1* | 10/2011 | Hinckley | 713/300 |
| 2012/0036261 A1* | 2/2012 | Salazar et al. | 709/225 |
| 2012/0280917 A1* | 11/2012 | Toksvig et al. | 345/173 |

FOREIGN PATENT DOCUMENTS

WO    WO-2008051472    5/2008

* cited by examiner

*Primary Examiner* — Thomas Lee
*Assistant Examiner* — Zhipeng Wang
(74) *Attorney, Agent, or Firm* — Kilpatrick Townsend & Stockton LLP

(57) ABSTRACT

A portable device to determine whether a user is holding the portable device, launch a mode of operation of the portable device if the user is holding the portable device, and modify an amount of power supplied to a component of the portable device based on the mode of operation.

20 Claims, 7 Drawing Sheets

METHOD FOR SELECTING AND LAUNCHING A HYBRID MODE OF OPERATION FOR A PORTABLE DEVICE BASED ON RECEIVED SENSOR INFORMATION AND A CURRENT MODE OF OPERATION

BACKGROUND

When accessing a portable device, a user can interact with a configuration or feature menu to modify various characteristics associated with the portable device. For example, the user can interact with a configuration menu to change settings or operating modes of the portable device. In response to the user making a selection on the configuration, an operating mode of the portable device may be utilized.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By detecting whether a hand of a user is touching a portable device, the portable device can determine if the user is holding the portable device. If the user is determined to be holding the portable device, one or more modes of operation of the portable device can be selected and launched. In one embodiment, one or more of the modes of operation can include an unlock mode, a silent mode, an entertainment mode, a speaker mode, a non-speaker mode, and/or a power saving mode.

By launching one or more modes of operation of the portable device in response to accurately detecting if the portable device is being held, a user friendly experience can be created for the user. Additionally, by modifying an amount of power supplied to one or more components of the portable device based on the mode of operation, an amount of power used by the portable device can be efficiently be managed. Management may include powering on or increasing power to components used by the mode of operation and/or powering off or decreasing power to components not used by the mode of operation.

Figure 1:
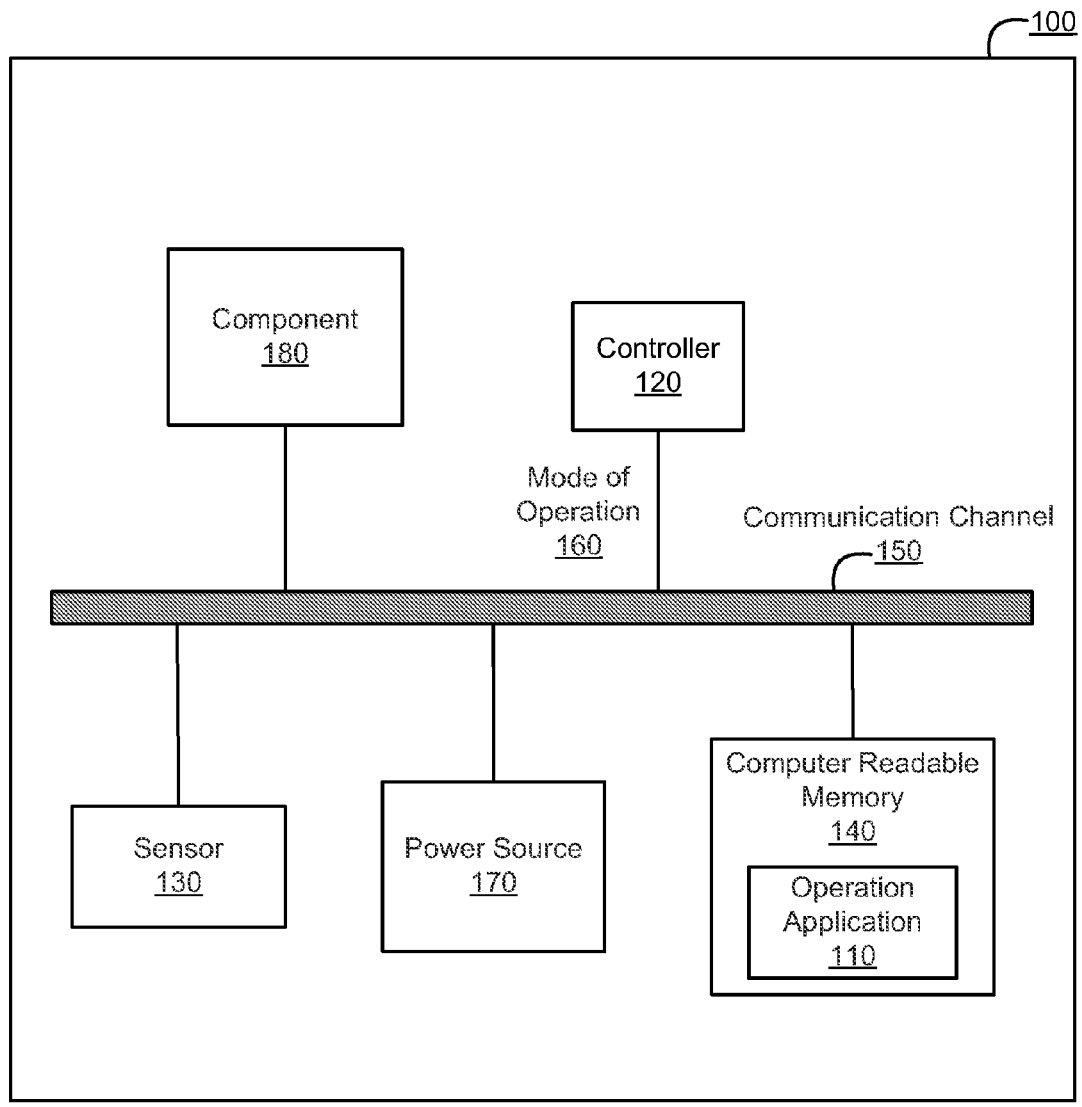
FIG. 1 illustrates a portable device according to an embodiment.

FIG. 1 illustrates a portable device 100 with a controller 120, a sensor 130, a power source 170, and at least one component 180 according to an embodiment. In one embodiment, the portable device 100 is a cellular device, a PDA (Personal Digital Assistant), a media player, a camera, and/or an E (Electronic) Book/Reader. In other embodiments, the portable device 100 is a laptop, a notebook, a tablet, a netbook, an aft-in-one system, and/or any additional portable device which can include a sensor 130, a power source 170, and/or at least one component 180.

As illustrated in FIG. 1, the portable device 100 includes a controller 120, a sensor 130, a power source 170, at least one component 180, and a communication channel 150 for the portable device 100 and/or one or more 180 components of the portable device 100 to communicate with one another. Additionally, the portable device 100 can include an operation application 110 stored on a computer readable memory 140 coupled to the portable device 100. In other embodiments, the portable device 100 includes additional components in addition to and/or in lieu of those noted above and illustrated in FIG. 1.

As noted above, the portable device 100 includes a controller 120. The controller 120 can send data and/or instructions to the sensor 130, the power source 170, at least one component 180, and/or the operation application 110. The controller 120 can also receive data and/or instructions from the sensor 130, the power source 170, at least one component 180, and/or the operation application 110.

The operation application 110 is an application which can be utilized in conjunction with the controller 120 to manage the portable device 100. The operation application 110 can be software or firmware executable from a tangible, non-transitory computer readable memory 140. The operation application 110 can communicate with components 180 coupled to the portable device 100 physically or wirelessly through a communication bus 150 included in or attached to the device 100. The communication bus 150 can be a memory bus and/or a data bus.

The operation application 110 and/or the controller 120 can manage the portable device 100 by selecting and launching a mode of operation 160 of the portable device 100 if a user is detected to be holding the portable device 100. In one embodiment, selecting and launching a mode of operation 160 can additionally be based on information obtained by the sensor 130. The information can include whether the user is viewing a display component of the portable device 100, whether the user is using the portable device 100 for an audio or video call, whether the portable device 100 is within proximity of the user's head, and/or if the user is no longer holding the portable device 100.

For the purposes of this application, a mode of operation 160 can include an operation state or activity of the portable device 100. In various embodiments, the modes of operation 160 include an entertainment mode, a silent mode, a speaker mode, a non-speaker mode, and/or a power saving mode. In other embodiments, the portable device 100 can include additional modes of operations 160 in addition to and/or in lieu of those noted above.

Before selecting and launching a mode of operation 160, a sensor 130 of the portable device 100 can detect for a hand of the user touching the portable device 100 to detect if the user is holding the portable device 100. The sensor 130 is a hardware component of the portable device 100 configured if a user is holding the portable device 100. The user can be detected to be holding the portable device 100 if the sensor 130 detects a plurality of fingers and/or a palm of the user touching a side panel and/or a rear panel of the portable device 100. In other embodiments, the sensor 130 can detect or obtain additional information from the user and/or from an environment around the portable device 100.

In response to detecting a hand of the user holding the portable device 100, the controller 120 and/or the operation application 110 can proceed to select and launch a mode of operation 160 of the portable device 100. In one embodiment, launching a mode of operation 160 includes the controller 120 and/or the operation application 110 identifying at least one component 180 utilized by the mode of operation 160. In another embodiment, launching a mode of operation 160 includes modifying a profile of the portable device 100 by configuring one or more settings of the portable device 100 and/or by enabling or disabling one or more features of the portable device 100.

In response to launching a mode of operation 160 of the portable device 100, an amount of power supplied from a power source 170 to at least one component 180 of the portable device 100 can be modified. The power source 170 is a hardware component of the portable device 100 configured to manage or modify an amount of power for at least one component 180 utilized by a mode of operation 160. One or more components 180 of the portable device 100 can include a display component, an audio component, an antenna, a communication component, a motor, and/or any additional hardware component of the portable device 100. In other embodiments, one or more components 180 can include the controller 120 and/or the sensor 130.

Figure 2A:
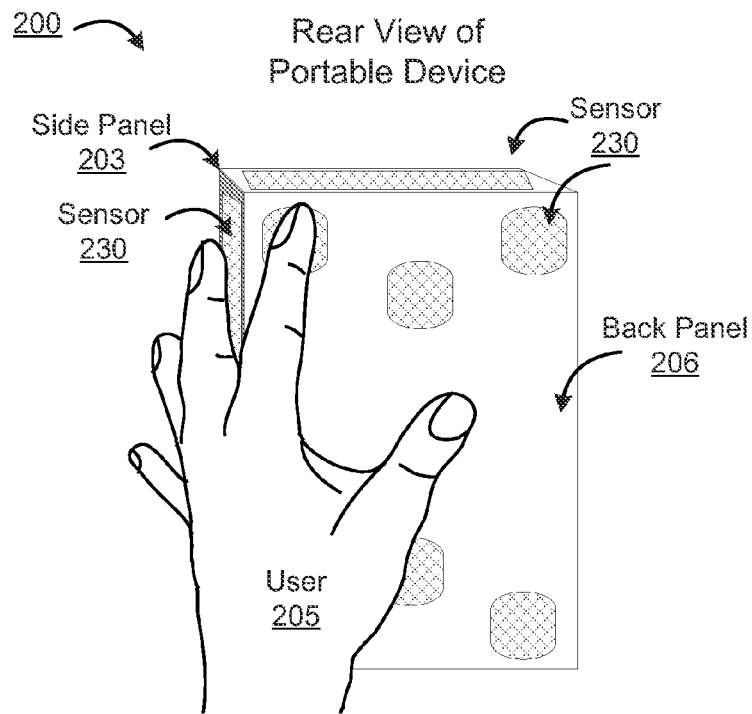
FIG. 2A and FIG. 2B illustrate one or more sensors at one or more locations of a portable device according to embodiments.
Figure 2B:
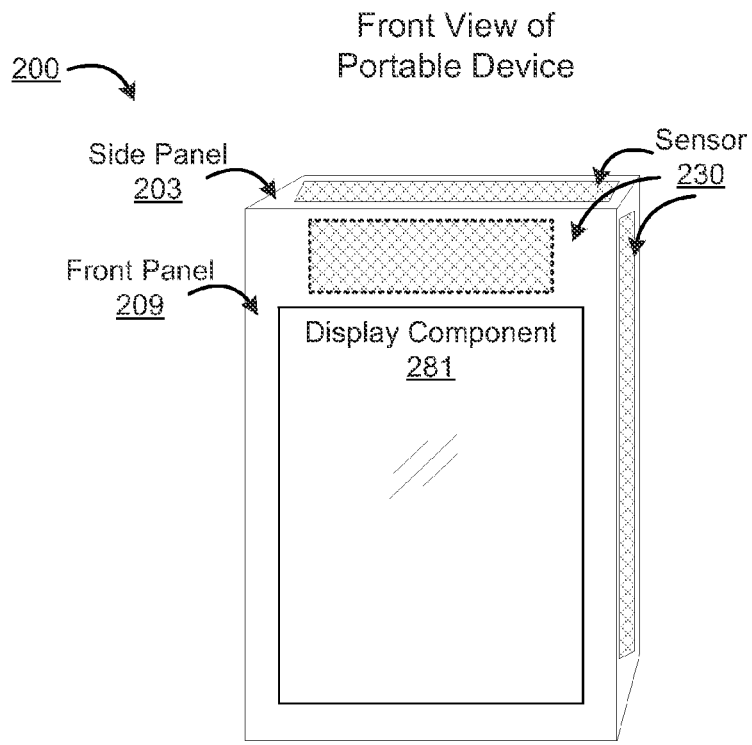

FIG. 2A and FIG. 2B illustrate one or more sensors 230 at one or more locations of a portable device 200 according to embodiments. As noted above, a sensor 230 is a hardware component of the portable device 200 configured to detect a user 205. In one embodiment, one or more sensors 230 can detect if a user's 205 hand is holding the portable device 200. As shown in the present embodiment, the user 205 can be any person which can hold the portable device 200 using the user's 205 fingers and/or palm. One or more sensors 230 can be a capacitive sensor, a pressure shield, an optical sensor, an image capture component, an acoustic sensor, a thermal sensor, an infrared sensor, an inductive charging shield, and/or any additional component configured to detect for the user 205 holding the portable device 200.

FIG. 2A illustrates a rear view of the portable device 200. As shown in the present embodiment, one or more sensors 230 can vary in size and/or shape. Additionally, one or more sensors 230 can be positioned at one or more locations, where the user 205 would likely touch if holding the portable device 200. In one embodiment, one or more sensors 230 can be located on a side panel 203 and/or on a rear panel 206 of the portable device 200. The side panel 203 can include a top, bottom, left, and/or right panel of the portable device 200. One or more of the sensors 230 can wrap across the surface or around a perimeter of the side panel 203. Additionally, one or more of the sensors 230 can be located at one or more locations of the rear panel 206.

When detecting for a user 205 holding the portable device 200, one or more sensor 230 can detect for the user's 205 hand touching or in contact with the portable device 200. For example, if one or more sensors 230 are capacitive sensors, the corresponding sensors 230 can detect information of a conductive or a dielectric response if the corresponding sensors 230 are touched by fingers and/or a palm. In another embodiment, if one or more sensors 230 are pressure sensors, the corresponding sensors 230 can detect a pressure or force from the fingers and/or a palm of the user 205.

Additionally, if one or more sensors 230 are optical sensors or image capture components, the corresponding sensors can detect light rays or capture images of touched locations of the portable device 200. Furthermore, if one or more sensors 230 are thermal sensors, the corresponding sensors can detect thermal temperatures at locations of the side panel 203 and/or the rear panel 206 to detect for the fingers and/or the palm of the user 205. In other embodiments, one or more of the sensors 230 can detect or obtain any additional information when detecting for a hand of the user 205 touching the portable device 200.

Using the information, a sensor 230, the controller, and/or the operation application can determine whether a detected conductivity, pressure, light response, image, temperature, and/or any additional detected information match a predefined conductivity, pressure, light response, image, and/or temperature corresponding to a plurality of fingers and/or a palm. In one embodiment, if the detected information matches the predefined information, the sensor 230 will have detected the user 205 holding the portable device 200.

In another embodiment, one or more sensors 230, a controller, and/or an operation application can additionally consider additional factors, such as a shape and/or a size of the detected fingers and/or palm. In other embodiments, one or more sensors 230, the controller, and/or the operation application can also consider a number of panels of the portable device 200 being touched. If a sensor 230, the controller, and/or the operation application determine that at least two panels of a top, bottom, left, right, and/or rear panel of the portable device 200 are accessed by the fingers and/or palm of the user 205, the user 205 will be determined to be holding the portable device 200.

In other embodiments, one or more sensors 230 can further detect a hand location of the user 205. The hand location can be determined based on which of the corresponding sensors 230 detect the user 205 holding the portable device. In other embodiments, one or more sensors 230 can detect if the user 205 is no longer holding the portable device 200 by detecting for the hand of the user 205 no longer touching the portable device 200.

FIG. 2B illustrates a front view of the portable device 200. As shown in the present embodiment, one or more sensors 230 can be located on a front panel of 209 of the portable device 200. In addition to detecting a user 205 holding the portable device 200 and/or a holding location of the portable device 200, one or more sensors 230 can detect or obtain additional information associated with the user 205. In one embodiment, one or more sensors 230 can be configured to detect whether the user 205 is viewing a display component 281 of the portable device 200. In another embodiment, one or more sensors 230 can detect whether a head of the user 205 is contacting or within proximity of the portable device 200.

One or more sensors 230, the controller, and/or the operation application can utilize gaze detection and/or eye tracking technology to detect whether the user is viewing the display component 281. The display component 281 can be an output device configured to render one or more images and/or videos. In one embodiment, the display component 281 can be a LCD (liquid crystal display), a LED (light emitting diode) display, a CRT (cathode ray tube) display, a plasma display, a projector and/or any additional device configured to display content.

Additionally, when detecting if a head of the user 205 is contacting or within proximity of the portable device 100, one or more sensors 230 can use one or more of the methods noted above to determine if the detected information matches predefined information of a head of the user 205. The predefined information of the head of the user 205 can list a predefined size and/or predefined surface area of a head, face, and/or ear of a person.

Figure 3A:
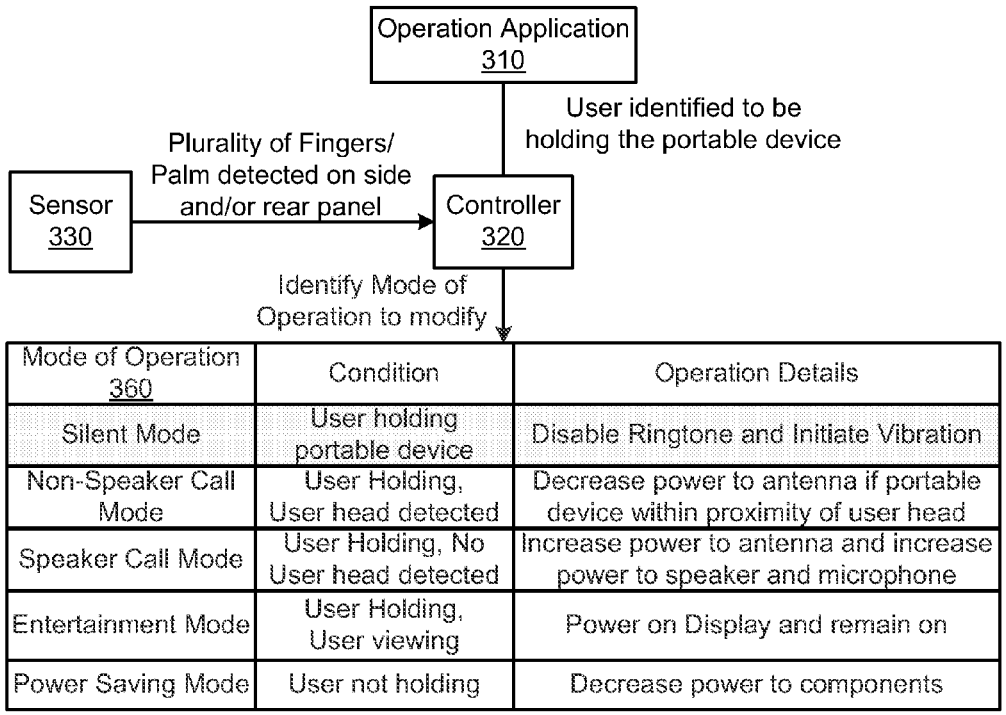
FIG. 3A illustrates a block diagram of an operation application identifying a mode of operation to launch according to an embodiment.

FIG. 3A illustrates a block diagram of an operation application 310 identifying a mode of operation 360 to launch according to an embodiment. As noted above, in response to one or more sensors 330 detecting the user holding the portable device, the controller 320 and/or the operation application 310 can proceed to select and launch a mode of operation 360 of the portable device. A mode of operation 360 can be an operation state or activity of the portable device which can be launched if the user is detected to be holding the portable device.

As shown in the present embodiment, a mode of operation 360 can include an entertainment mode, a silent mode, a speaker call mode, a non-speaker call mode and/or a power saving mode. In another embodiment, a mode of operation 360 can include a locked mode and/or an unlocked mode. In other embodiments, the portable device can include additional modes of operations 360 in addition to and/or in lieu of those noted above and illustrated in FIG. 3A. One or more modes of operation 360 can be listed on the portable device. Each of the modes of operation 360 can include corresponding launch conditions and corresponding operation details for the mode of operation 360.

A condition can list or specify any information, if detected by the sensor 330, can cause the corresponding mode of operation 360 to be launched. An operation detail can list or specify what happens if a mode of operation 360 is launched. For example, the operation detail can list which components of the portable device are used in the mode of operation 360. Additionally, the operation detail can list what functions or tasks the components are used for. Further, the operation detail can list any components of the portable device which are not used in the corresponding mode of operation 360.

When determining which of the modes of operations 360 to select for launch, the operation application 310 and/or the controller 320 can compare the information obtained from the sensor 330 to corresponding conditions of the modes of operation 360. If any of the modes of operation 360 include conditions which match the information, the corresponding mode of operation 360 will be selected to launch. Additionally, more than one mode of operation 360 can be launched if the modes of operation 360 include conditions which match the information.

As shown in the present embodiment, the controller 320 and/or the operation application 310 determine whether any of the modes of operation 360 can be launched based on the condition that the user is holding the portable device. The controller 320 and/or the operation application 310 determine that a Silent Mode of the portable device includes the condition for the user to be holding the portable device. As shown in FIG. 3A, the non-speaker call mode, the speaker call mode, and the entertainment mode additionally list the condition for the user to be holding the portable device, however they include additional conditions which have not been detected by the sensor 330. As a result, the controller 320 and/or the operation application 310 select and launch the Silent Mode of the portable device.

In another embodiment, the portable device can by default be in a Locked Mode. When in the Locked Mode, accessibility to the portable device can be restricted. If the portable device is initially in the Locked Mode, the controller 320 and/or the operation application 310 can additionally launch an Unlock Mode in response to detecting the user holding the portable device. When launching the Unlock Mode, the controller 420 and/or the operation application 410 can unlock a security of the portable device and the portable device and content of the portable device can become accessible.

Figure 3B:
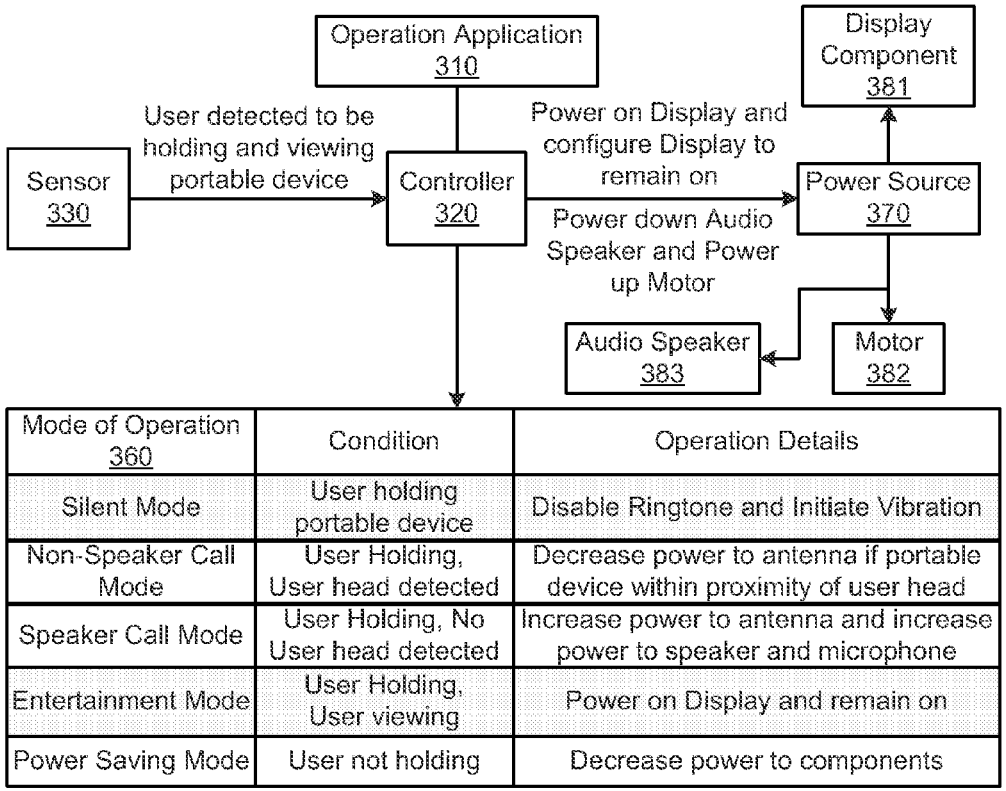
FIG. 3B illustrates a block diagram of a power source modifying an amount of power supplied to a component of a portable device based on a mode of operation of a portable device according to an embodiment.

FIG. 3B illustrates a block diagram of a power source 370 modifying an amount of power supplied to a component of a portable device based on a mode of operation 360 of the portable device according to an embodiment. As shown in the present embodiment, a sensor 330 has detected the user to be holding the portable device. Additionally, the sensor 330 has detected that the user is viewing a display component 386 of the portable device. In response, the controller 320 and/or the operation application 310 proceed to select modes of operation 360 based on the information detected or obtained from the sensor 330.

As shown in FIG. 3B, the controller 320 and/or the operation application 310 determine that the Silent Mode and the Entertainment Mode match the information. As a result, the Silent Mode and the Entertainment Mode are selected to be launched. As noted above, launching a mode of operation 360 can include modifying one or more settings or profiles to enable or disable a feature of the portable device. In one embodiment, the Silent Mode can be included as part of an audio profile of the portable device. As a result, by launching the Silent Mode, the audio profile can be modified.

Additionally, when launching a selected mode of operation 360, the controller 320 and/or the operation application 310 can identify which components of the portable device are used by the mode of operation 360. As shown in FIG. 3B, the Silent Mode lists for a ringtone of the portable device to be disabled and for a vibration of the portable device to be enabled. As a result, the controller 320 and/or the operation application 310 determine that an audio speaker 383 of the portable device can be powered down or receive less power. Additionally, a motor 382 to cause the portable device to vibrate can be powered on or receive more power.

In another embodiment, the Silent Mode can list for the ringtone and the vibration to be disabled. By launching the Silent Mode if the user is holding the portable device, the ringtone of the portable device can be disabled and the user can be notified of any alerts through a display component and/or through vibration from the motor 382. Additionally, an amount of power can be saved by decreasing or not supply power to an audio speaker.

Furthermore, the Entertainment Mode lists for the display component 386 to be powered on and remain on. As a result, the controller 320 and/or the operation application 310 determine that the display component 381 is to be powered on or receive more power. By launching the Entertainment Mode if the user is holding the portable device and viewing the display component 381, the display component 381 can remain powered on for the user to continue to view media, images, text, and/or any information on the display component 381.

As noted above, a power source 370 can modify an amount of power to one or more components of the portable device based on a mode of operation 360. The power source 370 is a hardware component configured to manage an amount of power supplied to components identified to be used by a mode of operation 360 and components identified not to be used by a mode of operation 360. The power source 370 can manage the amount of power supplied by powering on, powering down, increasing, and/or decreasing an amount of power available to one or more components. In one embodiment, the power source 370 can be a power supply, a battery, and/or a generator of the portable device.

As shown in the present embodiment, in response to launching the Silent Mode and the Entertainment Mode, the controller 320 and/or the operation application 310 configure or instruct the power source 370 to power on or increase an amount of power to the motor 382 and the display component 386. Additionally, the controller 320 and/or the operation application 310 can configure the display component 381 to remain on. Further, the power source 370 can be configured or instructed to power down or decrease power to the audio speaker 383. In another embodiment, if any media is being played on the portable device, a ringtone of the portable device can be disabled, while the audio speaker 383 outputs audio from the media.

Figure 4A:
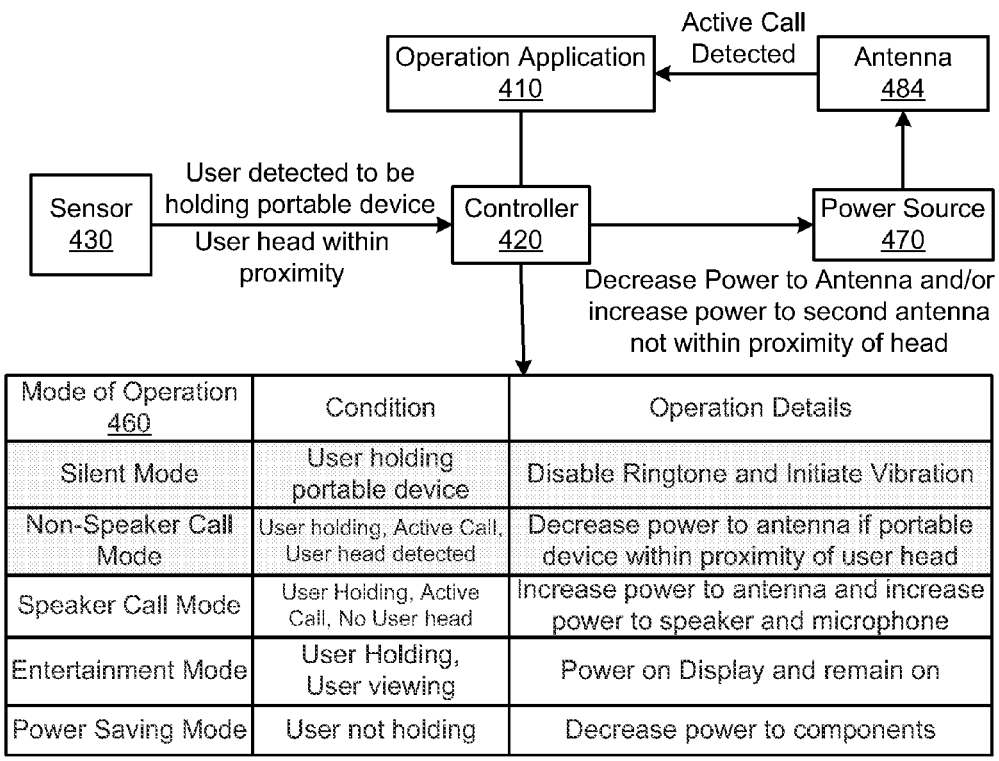
FIG. 4A and FIG. 4B illustrate block diagrams of an amount of power supplied to a component being modified based on a mode of operation of a portable device according to other embodiments.
Figure 4B:
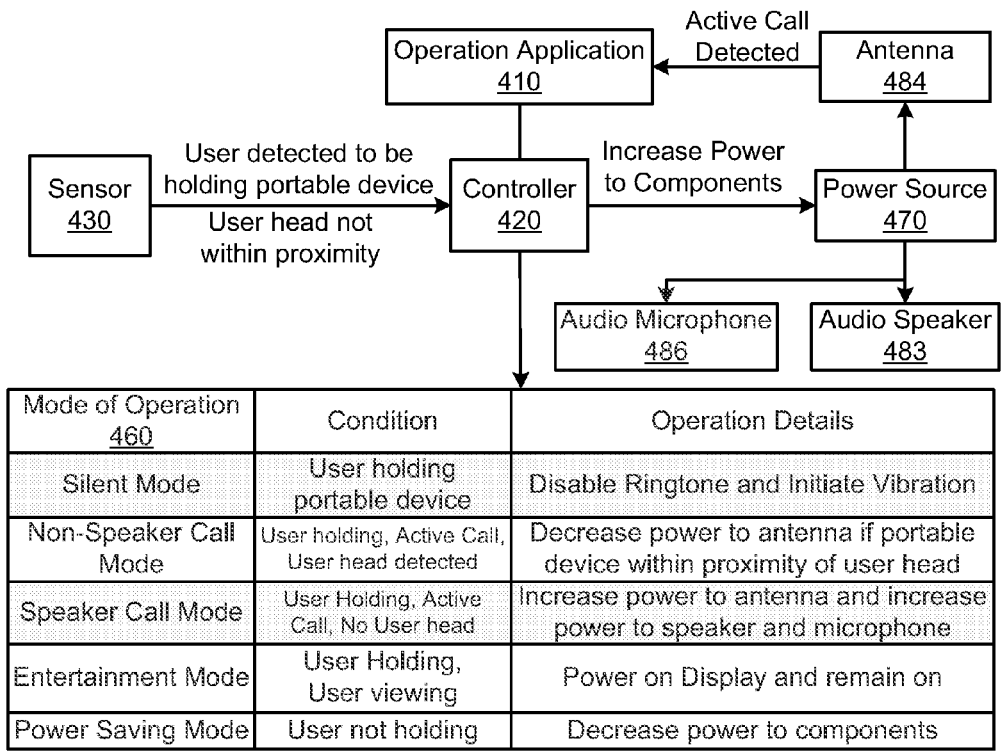

FIG. 4A and FIG. 4B illustrate block diagrams of an amount of power supplied to at least one component of a portable device being modified based on a mode of operation 460 of the portable device according to other embodiments. In one embodiment, as illustrated in FIG. 4A, the portable device can additionally include an antenna 484. The antenna 484 is a communication component which can allow the user of the portable device to make or receive an audio and/or a video call. In one embodiment, the antenna 484 is a diversity antenna consisting of more than one antenna. In another embodiment, the antenna 484 can be any additional wireless radio, a wireless network interface, Bluetooth component, and/or any additional component which can receive and/or send audio and/or video communication data.

If the portable device includes an antenna 484, the controller 420 and/or the operation application 410 can additionally detect whether an audio and/or video call of the portable device is active. An active call is detected if the antenna 484 is receiving and/or sending audio and/or video communication data. In response to detecting an active call, the controller 420 and/or the operation application 410 determine that the user is using the portable device for an audio and/or a video call.

Additionally, the controller 420 and/or the operation application 410 can determine what information of the user the sensor 430 detected or obtained. As shown in FIG. 4A, the sensor 430 has detected the user to be holding the portable device and the user's head is detected to be contacting or within proximity of the portable device. The controller 420 and/or the operation application 410 proceed to select any modes of operation 460 with conditions listing for an active call and the information from the sensor 430.

As shown in FIG. 4A, the controller 420 and/or the operation application 410 select the Silent Mode and the Non-Speaker Mode of the portable device to launch. The operation details of the Non-Speaker Mode list for an amount of power supplied to the antenna 484 to be decreased if the portable device is within proximity of the user's head. The controller 420 and/or the operation application 410 proceed to configure the power source 470 to power down or decrease an amount of power supplied to the antenna 484. By decreasing the amount of power supplied to the antenna 484, an amount of electromagnetic waves and/or any electrical signal around the head of the user can be decreased.

In another embodiment, if the antenna 484 is a diversity antenna, the controller 420 and/or the operation application 410 can configure the power source 470 to decrease an amount of power supplied to a first antenna close or within proximity of the user's head. Additionally, the controller 420 and/or the operation application 410 can configure the power source 470 to increase an amount of power supplied to a second antenna of the diversity antenna, if the second antenna is farther away from the user's head than the first antenna. In one embodiment, the controller 420 and/or the operation application 410 can additionally tune the antenna 484 by modifying a gain of the antenna 484 based on the previously detected holding location of the user and/or a position of the user's head.

In another embodiment, as illustrated in FIG. 4B, an active call is detected by the controller 420 and/or the operation application 410 and the sensor 430 has detected the user to be holding the portable device. However, the head of the user is not detected by the sensor 430 to be within proximity of the portable device. As a result, instead of launching Non-Speaker Mode of the portable device, the controller 420 and/or the operation application select for the Silent Mode and the Speaker Mode of the portable device to be launched.

As illustrated in FIG. 4B, the operation details for the Speaker Mode list for an amount of power for the antenna 484, the audio speaker 483, and the audio microphone 486 to be increased. The controller 420 and/or the operation application 410 can configure the power source 470 to power on or increase an amount of power supplied to the antenna 484, the audio speaker 483, and/or the audio microphone 486. By increasing the amount of power for the antenna 484, a reception and/or connection of the antenna 484 can be improved.

In one embodiment, the controller 420 and/or the operation application 410 can further tune the antenna by modifying a gain of the antenna 484 based on a previously detected holding location of the portable device by the user. Additionally, because the portable device is not being held up to the user's ear or head, a sensitivity and/or an amount of power supplied to the audio speaker 483 and/or the audio microphone can be increased to improve an audio or video call experience of the user.

Figure 5:
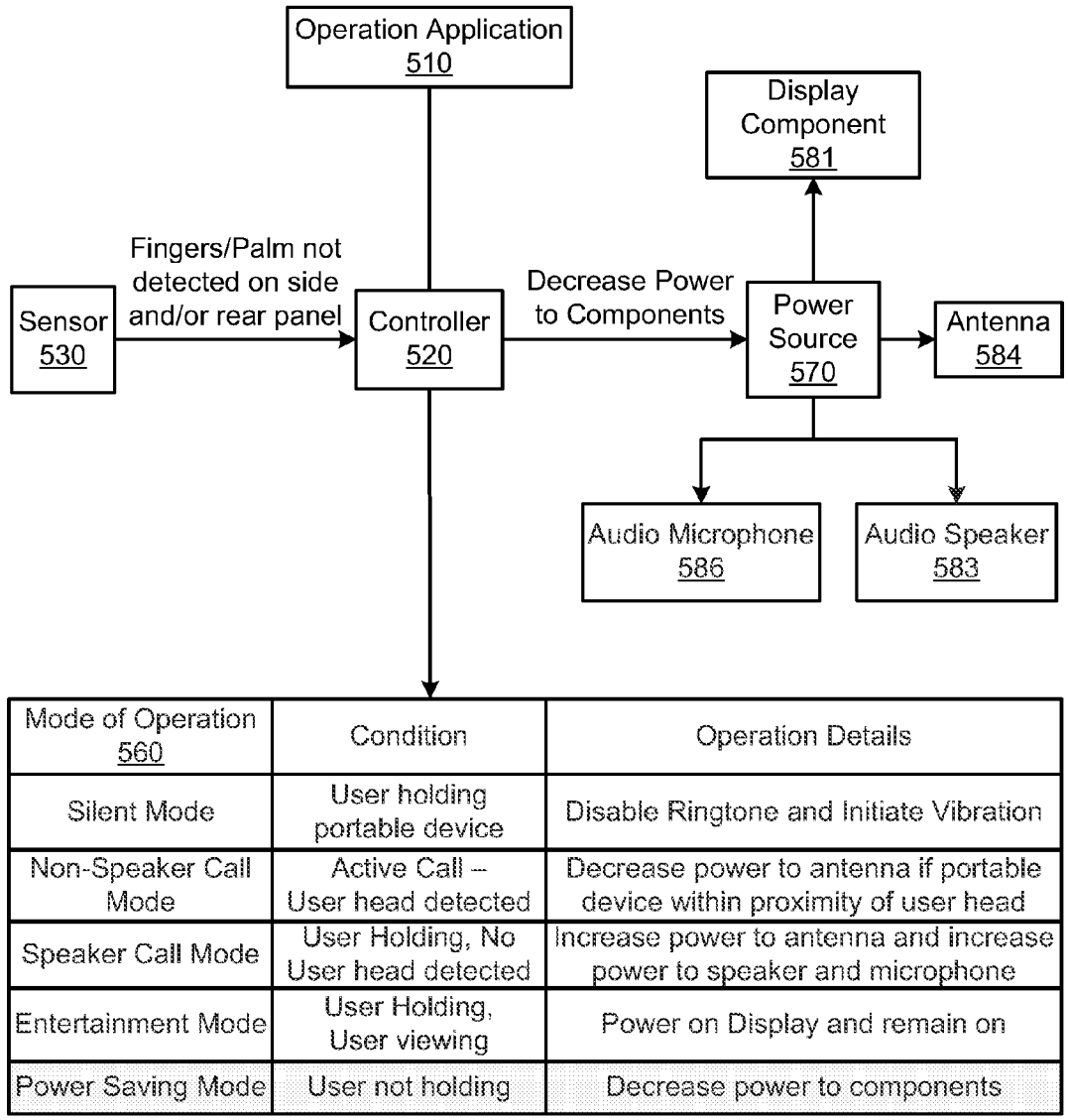
FIG. 5 illustrates block diagram of an operation application launching a mode of operation of a portable device if a user is not detected to be holding the portable device according to an embodiment.

FIG. 5 illustrates block diagram of an operation application 510 launching a mode of operation 560 of a portable device if a user is not detected to be holding the portable device according to an embodiment. As noted above, the sensor 530 can detect for fingers and/or a palm leaving the portable device to detect if the user is no longer holding the portable device. Additionally, a mode of operation 560 can be launched if the user is detected to no longer be holding the portable device.

As shown in the present embodiment, the sensor 530 has detected the user to no longer be holding the portable device. The controller 520 and/or the operation application 510 proceed to select a mode of operation 560 to launch corresponding to the detected condition. As shown in the present embodiment, a Power Saving Mode includes the condition for the user to no longer be holding the portable device. Additionally, the operation details of the Power Saving Mode list for an amount of power supplied to components of the portable device to be decreased.

The controller 520 and/or the operation application 510 proceed to configure the power source 570 to power down and/or decrease an amount of power supplied to one or more components of the portable device. As a result, the power source 570 proceeds to power down and/or reduce an amount of power supplied to the display component 581, the antenna 584, the audio speaker 583, the audio microphone 586, and/or any additional component coupled to the portable device. By powering down one or more components, power of the portable device can be conserved and a duration of the power source 570 can be increased.

Figure 6:
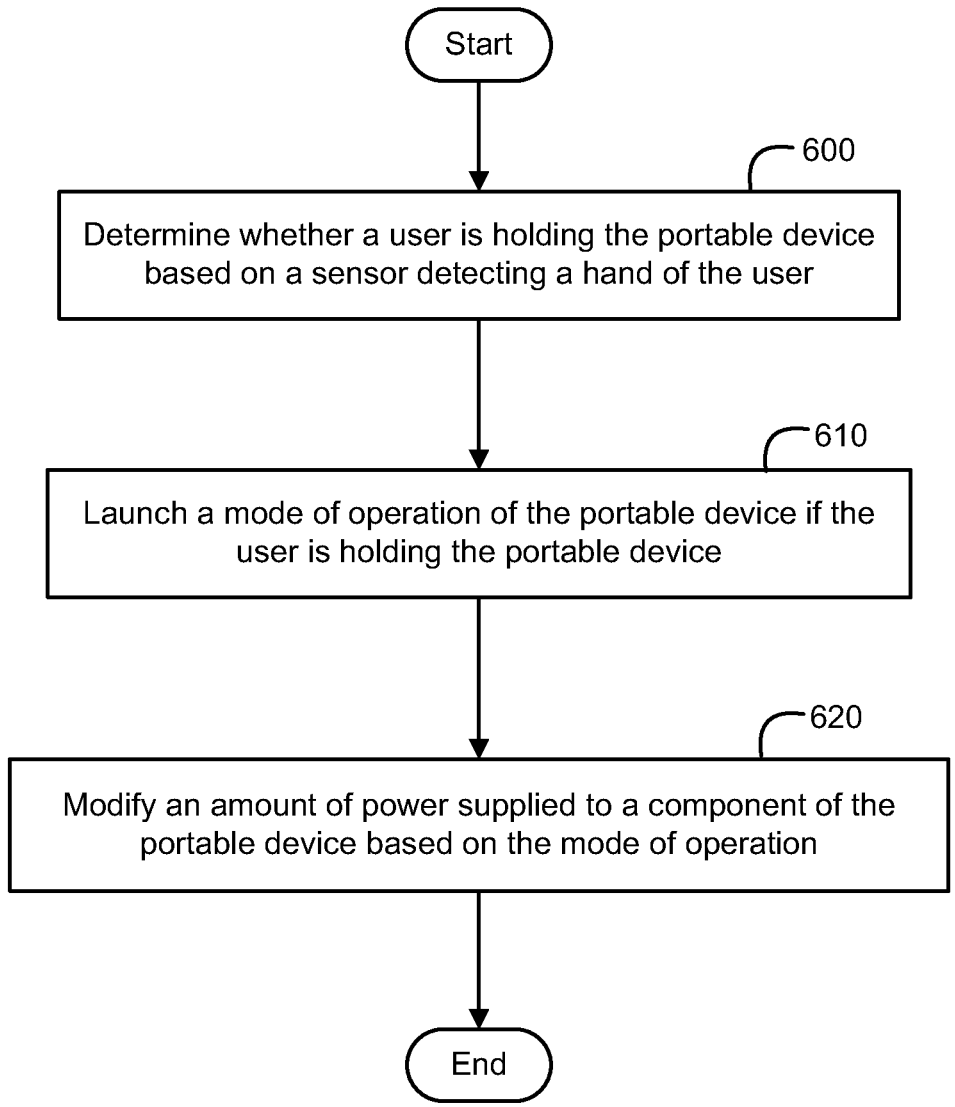
FIG. 6 is a flow chart illustrating a method for managing a portable device according to an embodiment.

FIG. 6 is a flow chart illustrating a method for managing a portable device according to an embodiment. The method of FIG. 6 uses a portable device with a controller, a sensor, a power source, at least one component, a communication channel, and/or an operation application. In other embodiments, the method of FIG. 6 uses additional components and/or devices in addition to and/or in lieu of those noted above and illustrated in FIGS. 1, 2, 3, 4, and 5.

As noted above, the operation application is an application which can be used in conjunction with the controller to manage the portable device. Managing the portable device includes launching one or more modes of operation of the portable device if a user is detected to be holding the portable device. In another embodiment, one or more modes of operation can be launched if the user is no longer holding the portable device. In other embodiments, one or more modes of operation can be launched based on if an audio or video call of the portable device is active and/or based on any information detected or obtained from a sensor.

A sensor of the device can detect for a hand of a user touching the portable device to detect whether the user is holding the portable device 600. One or more sensors can be located at one or more locations of the portable device, such as a side panel, a front panel, and/or a rear panel. If the user is detected to be holding the portable device, the controller and/or the operation application can proceed to select and launch one or more modes of operation of the portable device 610.

As noted above, a mode of operations can be an operation state or activity of the portable device. Additionally, a mode of operation can specify which components of the portable device are used by the corresponding mode of operation and what functions or tasks the components are used for. In one embodiment, a mode of operation can additionally list components of the portable device which are not used by the corresponding mode of operation.

In response to selecting and launching one or more modes of operation, a power source of the portable device can modify an amount of power supplied to one or more components of the portable device based on the corresponding mode of operation 620. When modifying an amount of power, the power source can power on or increase an amount of power to a component used by the corresponding mode of operation. Additionally, the power source can power off or decrease an amount of power to components not used by the corresponding mode of operation. The method is then complete. In other embodiments, the method of FIG. 6 includes additional steps in addition to and/or in lieu of those depicted in FIG. 6.

Figure 7:
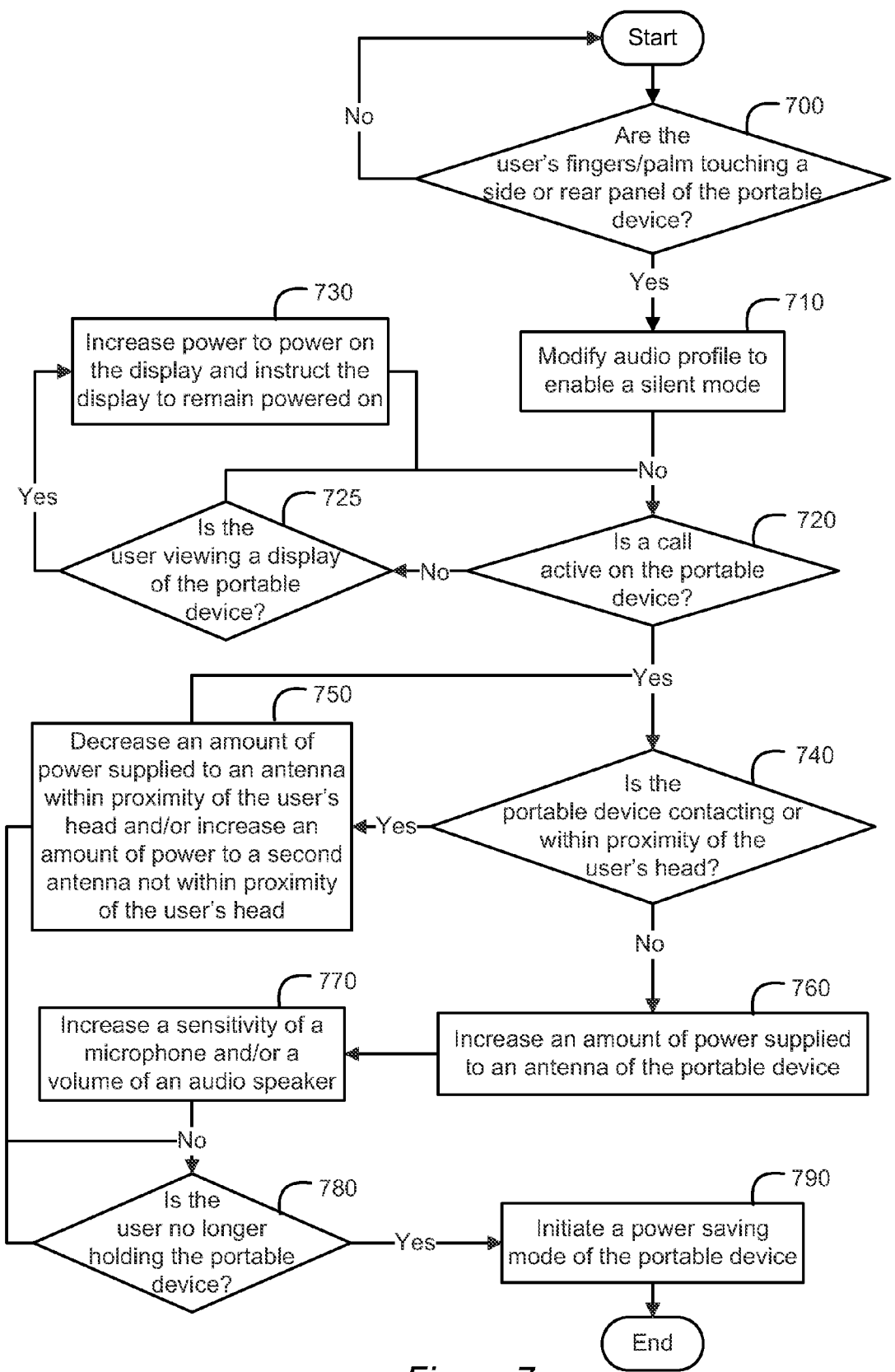
FIG. 7 is a flow chart illustrating a method for managing a portable device according to another embodiment.

FIG. 7 is a flow chart illustrating a method for managing a portable device according to another embodiment. Similar to above, the method of FIG. 7 uses a device with a controller, a sensor, a power source, one or more components, a communication channel, and/or an operation application. In other embodiments, the method of FIG. 7 uses additional components and/or devices in addition to and/or in lieu of those noted above and illustrated in FIGS. 1, 2, 3, 4, and 5.

The sensor can initially detect if a user's fingers and/or a palm of a user are touching a side panel and/or rear panel of the portable device 700. If the user's fingers and/or palm are not detected, the sensor can continue to detect for fingers and/or a palm touching a side panel and/or a rear panel of the portable device 700. If the user's fingers and/or palm are detected to be touching one of the panels, the user will have been detected to be holding the portable device.

In another embodiment, the sensor, the controller, and/or the operation application can consider additional factors, such as a size of the touch, a shape of the touch, and/or a number of panels touched to determine if the user is holding the portable device. The sensor can additionally detect or obtain additional information associated with the user, such as whether the user is viewing a display component of the portable device, whether the portable device is touching or within proximity of a head of the user, and/or whether the user is no longer holding the portable device.

If the user is detected to be holding the portable device, the controller and/or the operation application can proceed to access modes of operations of the portable device to determine if any of the modes list for the user to be holding the portable device. The controller and/or the operation application can determine that a Silent Mode is listed to be launched if the user is detected to be holding the portable device. The controller and/or the operation application can then proceed launch the Silent Mode 710. As noted above, launching the Silent Mode can include modifying one or more profiles, such as an audio profile of the portable device.

Additionally, if the portable device includes an antenna, the controller and/or the operation application can determine whether an audio call of the portable device is active by determining whether the antenna is receiving and/or sending audio or video communication 720. If an audio call is not active, the controller and/or the operation application can determine if the sensor previously detected if the user was viewing the display component of the portable device 725.

If the user was or is continuing to view the display component, the controller and/or the operation application can launch an entertainment mode of the portable device for the display component to power on and remain on 730. In another embodiment, if the user is not detected to be viewing the display component, the controller and/or the operation application can continue to determine whether an audio call of the portable device is active 720.

In another embodiment, if a call was detected to be active, the controller and/or the operation application can determine whether the portable device is detected to be touching or within proximity of the head of the user 740. If the information detected or obtained by the sensor indicates that the portable device is touching or within proximity of the user's head, the controller and/or the operation application can launch non-speaker mode of the portable device. As noted above, when launching the non-speaker mode, the controller and/or the operation application can decrease an amount of power supplied to an antenna within proximity of the user's head and/or increase an amount of power to a second antenna not within proximity of the user's head 750. The sensor can then detect if the user is no longer holding the portable device 780.

In another embodiment, if the sensor determined that the portable device is not touching or within proximity of the user's head, the controller and/or the operation application can launch a speaker mode of the portable device. As noted above, launching the speaker mode includes increasing an amount of power supplied to at least one of the antennas of the portable device 760. Additionally, launching the speaker mode can include increasing an amount supplied to an audio speaker and/or an audio microphone of the portable device to increase a volume of the audio speaker and/or increase a sensitivity of the audio microphone 770.

The sensor can then detect if the user is no longer holding the portable device 780. If the sensor does not detect the user's fingers and/or palm leaving the portable device, the user will be determined to be continuing to hold the portable device. Additionally, the sensor can continue to detect for the user no longer holding the portable device 780. If the fingers and/or palm of the user are detected to be leaving one or more panels of the portable device, the user will no longer be detected to be holding the portable device.

The controller and/or the operation application can then launch a power saving mode of the portable device. As noted above, launching the power saving mode includes powering down or decreasing an amount of power supplied to one or more components of the portable device. The method is then complete. In other embodiments, the method of FIG. 7 includes additional steps in addition to and/or in lieu of those depicted in FIG. 7.

What is claimed is:

1. A method for managing a portable device comprising:
   receiving sensor information from one or more sensors of the portable device;
   determining a condition based on the sensor information, wherein the condition is based on whether a user's hand is contacting the portable device, whether the user's head is detected, and a current mode of operation;
   determining an operational detail based on the condition; and
   selecting and launching a hybrid mode of operation based on the condition and the operational detail, wherein the hybrid mode of operation is based on at least two operation modes of the portable device.

2. The method for managing a portable device of claim 1 wherein determining whether the user's hand is contacting the portable device includes an optical sensor detecting at least one of a side panel and a rear panel of the portable device for the user touching the portable device.

3. The method for managing a portable device of claim 1 wherein the user is determined to be holding the portable device if one of the sensors detects pressure from the hand of the user.

4. The method for managing a portable device of claim 1 wherein selecting and launching the hybrid mode of operation includes changing an audio profile of the portable device to at least one of a silent profile and a vibration profile.

5. The method for managing a portable device of claim 1 further comprising detecting information of the user and selecting a mode of operation to launch based on the detected information.

6. The method for managing a portable device of claim 5 wherein detecting information of the user includes detecting whether the portable device is within proximity of the user's head.

7. The method for managing a portable device of claim 6 wherein selecting and launching the mode of operation of the portable device includes tuning an antenna of the portable device based on a hand position of the user and a location of the head of the user.

8. The method for managing a portable device of claim 7 wherein selecting and launching the mode of operation comprises decreasing an amount of power supplied to the antenna if the portable device is within proximity of the user's head.

9. The method for managing a portable device of claim 7 wherein selecting and launching the mode of operation comprises increasing power supplied to a second antenna not within proximity of the user's head.

10. The method for managing a portable device of claim 5 wherein detecting information of the user includes detecting whether the user is viewing a display component of the portable device; and
    wherein selecting and launching the mode of operation comprises powering on the display component and instructing the display component to remain powered on if the user is holding the portable device and the user viewing the display component.

11. A portable device comprising:
    one or more sensors;
    a controller configured to:
    receive sensor information from the one or more sensors;
    determine a condition based on the sensor information, wherein the condition is based on whether a user's hand is contacting the portable device, whether the user's head is detected, and a current mode of operation;
    determine an operational detail based on the condition;
    select and launch a hybrid mode of operation of the portable device based on the condition and the operational detail, wherein the hybrid mode of operation is based on at least two operation modes of the portable device; and
    a power source configured to modify an amount of power supplied to a component of the portable device.

12. The portable device of claim 11 wherein the controller is further configured to cause the power source to modify an amount of power supplied to a diversity antenna of the portable device based on the condition and operational detail of the portable device.

13. The portable device of claim 12 wherein the controller is further configured to modify a gain of the diversity antenna based on a hand position of the user and a location of a head of the user.

14. The portable device of claim 11 wherein the controller is further configured to cause the power source to modify an amount of power supplied to at least one of an audio component and a motor component of the portable device based on the condition and the operational detail of the portable device.

15. The portable device of claim 11 wherein the controller is further configured to cause the power source to modify an amount of power supplied to a display component of the portable device based on the condition and operational detail of the portable device.

16. A non-volatile computer readable medium comprising instructions configured to cause a controller to execute a method, the program code comprising:
    program code for receiving sensor information from a plurality of sensors;
    program code for determining a condition based on the sensor information, wherein the condition is based on whether a user's hand is contacting the portable device, whether the user's head is detected, and a current mode of operation;
    program code for determining an operational detail based on the condition; and
    program code for selecting and launching a hybrid mode of operation of the portable device based on the condition and the operational detail, wherein the hybrid mode of operation is based on at least two operation modes of the portable device; and
    program code for modifying an amount of power supplied to a component of the portable device based on the hybrid mode of operation.

17. The non-volatile computer readable medium comprising instructions of claim 16 further comprising program code for receiving additional sensor information from the one or more sensors; and wherein the program code for determining the condition comprises program code for determining the condition based on the additional sensor information.

18. The non-volatile computer readable medium comprising instructions of claim 17 wherein the current mode of operation is a power saving mode of the portable device.

19. The portable device of claim 11 wherein:
    the controller is further configured to receive information about the user's head from one of the one or more sensors; and
    determine if the information matches predefined information of the head of the user before launching the mode of operation.

20. The portable device of claim 11 wherein:
at least one of the one or more sensors is configured to detect information about a head, face, or ear of the user; and
the controller is further configured to determine if the sensor information matches a predefined size or surface area of the head, face, or ear of the user before selecting and launching the mode of operation.

* * * * *